(12) United States Patent
Galiano et al.

(10) Patent No.: US 8,562,728 B2
(45) Date of Patent: Oct. 22, 2013

(54) PROCESS FOR PREPARING PROTON-CONDUCTING CLAY PARTICLES AND COMPOSITE MATERIAL COMPRISING SUCH PARTICLES

(75) Inventors: Hervé Galiano, Jour les Tours (FR); Magaly Caravanier-Caillon, Rilly sur Loire (FR); Philippe Bebin, Tours (FR); Patrick Hourquebie, Esvres sur Indre (FR); Faïza Bergaya, St Cyr en Val (FR); Fabienne Poncin Epaillard, Le Mans (FR); Fabrice Lafleche, Garches (FR)

(73) Assignee: Commissariat a l'Energie Atomique, Paris (FR)

( * ) Notice: Subject to any disclaimer, the term of this patent is extended or adjusted under 35 U.S.C. 154(b) by 791 days.

(21) Appl. No.: 11/547,443

(22) PCT Filed: Apr. 15, 2005

(86) PCT No.: PCT/FR2005/050246
§ 371 (c)(1),
(2), (4) Date: Oct. 5, 2006

(87) PCT Pub. No.: WO2005/101552
PCT Pub. Date: Oct. 27, 2005

(65) Prior Publication Data
US 2008/0102339 A1    May 1, 2008

(30) Foreign Application Priority Data
Apr. 15, 2004 (FR) .................... 04 03939

(51) Int. Cl.
*H01M 8/10* (2006.01)
(52) U.S. Cl.
USPC ........ 106/14.44; 106/607; 106/632; 106/633; 429/483; 429/492; 429/493; 429/520; 429/534

(58) Field of Classification Search
USPC ............ 429/33, 306, 314; 428/411; 427/535, 427/537
See application file for complete search history.

(56) References Cited

U.S. PATENT DOCUMENTS

| 6,071,335 A | 6/2000 | Braggs et al. |
| 7,258,899 B1 * | 8/2007 | Sharma et al. ................ 427/535 |

(Continued)

FOREIGN PATENT DOCUMENTS

| WO | WO 02/092673 | 11/2002 |
| WO | WO02092673 | * 11/2002 |

(Continued)

OTHER PUBLICATIONS

Membranes based on Phosphotungstic acid and Polybenzimidazole for fuel cell application by P Staiti et al. Journal of Power Sources (2000) 231-235.*

(Continued)

*Primary Examiner* — Melvin C Mayes
*Assistant Examiner* — Colette Nguyen
(74) *Attorney, Agent, or Firm* — Brinks Hofer Gilson & Lione

(57) ABSTRACT

The invention relates to a process for preparing proton-conducting clay particles, successively comprising the following steps:
  a) a step of activating a clay powder, comprising a step in which the said powder is subjected to a gas plasma;
  b) a grafting step comprising a step of placing the activated powder obtained from step a) in contact with a solution comprising at least one compound comprising at least one group chosen from —$PO_3H_2$, —$CO_2H$ and —$SO_3H$ and salts thereof and comprising at least one group capable of grafting onto the surface of the said powder.

Use of these particles for the manufacture of fuel cell membranes.

27 Claims, 1 Drawing Sheet

(56) References Cited

U.S. PATENT DOCUMENTS

| | | |
|---|---|---|
| 2002/0094466 A1 | 7/2002 | Kerres et al. |
| 2003/0032739 A1 | 2/2003 | Kerres et al. |
| 2004/0048129 A1* | 3/2004 | Taft et al. ............ 429/33 |
| 2004/0191522 A1* | 9/2004 | Haring et al. ............ 428/411.1 |
| 2005/0118478 A1 | 6/2005 | Kiefer et al. |

FOREIGN PATENT DOCUMENTS

| | | | |
|---|---|---|---|
| WO | WO 03/074595 | | 9/2003 |
| WO | WO03/074595 | * | 9/2003 |
| WO | WO 03/081691 | | 10/2003 |

OTHER PUBLICATIONS

Hirata et al., "Preparation and Characterization of Highly Proton-Conductive Composites Composed of Phosphoric Acid-Doped Silica Gel and Styrene-Ethylene-Butylene-Styrene Elastomer," Journal of Sol-Gel Science and Technology, vol. 17, pp. 61-69 (2000).

Jeon et al., "Characterization of polyisoprene-clay nanocomposites prepared by solution blending," Polymer, vol. 44, No. 19, pp. 5749-5758 (Sep. 2003).

Malhotra et al., "Membrane-Supported Nonvolatile Acidic Electrolytes Allow Higher Temperature Operation of Proton-Exchange Membrane Fuel Cells," J. Electrochem. Soc., vol. 144, No. 2, pp. L23-L26 (Feb. 1997).

Staiti et al., "Membranes based on phosphotungstic acid and polybenzimIdazole for fuel cell application," Journal of Power Sources, vol. 90, pp. 231-235 (2000).

Baradie B., et al., "Water Sorption and Protonic Conductivity in a Filled/Unfilled Thermostable Ionomer for Proton Exchange Membrane", Macromol. Symp., 1999, p. 85-91, vol. 138.

* cited by examiner

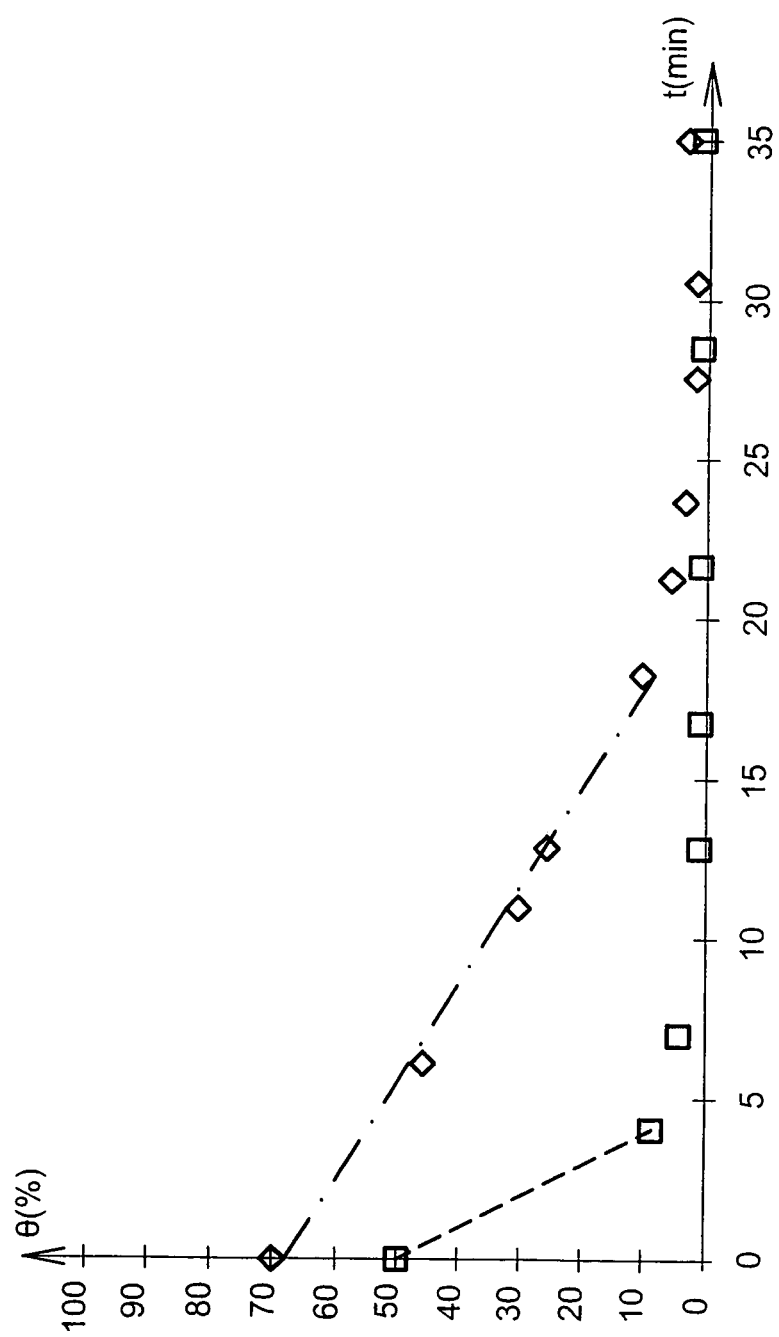

PROCESS FOR PREPARING PROTON-CONDUCTING CLAY PARTICLES AND COMPOSITE MATERIAL COMPRISING SUCH PARTICLES

TECHNICAL FIELD

The present invention relates to a process for preparing proton-conducting particles by grafting acidic organic compounds onto the surface of clay particles.

The present invention also relates to the particles obtained via this process.

These particles have the particular feature of having a particularly high ion exchange capacity combined with very good water-retaining properties.

As a result, these particles find their application in the development of proton-conducting materials, in particular materials for inclusion in the constitution of proton-conducting membranes for fuel cells, such as $H_2$/air or $H_2/O_2$ cells (also known under the abbreviation PEMFC meaning "Proton Exchange Membrane Fuel Cell") or methanol/air cells (known under the abbreviation DMFC meaning "Direct Methanol Fuel Cell").

Thus, the technical field of the invention may be defined in general as that of proton-conducting particles and materials containing them.

More specifically, the invention lies in the field of proton-conducting particles used in the constitution of membranes for fuel cells operating at low temperatures.

PRIOR ART

A fuel cell is an electrochemical generator, which converts the chemical energy from an oxidation reaction of a fuel in the presence of an oxidizer into electrical energy.

Generally, a fuel cell comprises a plurality of electrochemical cells mounted in series, each cell comprising two electrodes of opposite polarity separated by a proton-exchange membrane acting as a solid electrolyte.

The membrane allows the passage to the cathode of the protons formed during the oxidation of the fuel at the anode.

The membranes structure the core of the cell and should consequently have good performance qualities in terms of proton conduction, and also low permeability to reactant gases ($H_2$/air or $H_2/O_2$ for PEMFC cells and methanol/air for DMFC cells). The properties of the materials constituting the membranes are essentially heat stability, resistance to hydrolysis and to oxidation, and also a certain amount of mechanical flexibility.

Membranes that are commonly used and that satisfy these requirements are membranes obtained from polymers consisting of a perfluorinated linear main chain and of side chains bearing sulfonic acid groups. Among the most known, mention may be made of the membranes sold under the name Nafion® by the company Dupont de Nemours or under the name Dow®, Flemion® or Aciplex by the companies Dow Chemicals and Asahi Glass. These membranes have good electrochemical performance qualities and a service life that is advantageous but, however, insufficient for PEMFC applications. Furthermore, their cost (more than 500 euros/m²) remains prohibitive for commercialization. For DMFC applications, they show high permeability to methanol, which also limits their use with this type of fuel. Finally, these membranes show high sensitivity to temperatures of greater than 80° C., which excludes them from use in cells operating at high temperatures, i.e. between 80° C. and 150° C.

Moreover, it is known that the conductive efficacy of a proton membrane is greatly associated with the presence of water and thus with the water-retaining capacity of the membrane. However, at temperatures close to 100° C., and even more so beyond this point, the water is rapidly evacuated from the membrane, thus causing a loss of conductivity and increasing the permeability to the fuel. At these temperatures, this reduction in performance qualities may be accompanied by a degradation of the membrane. To solve the problems of drying-out of membranes in fuel cells at high temperature, i.e. at least equal to 100° C., it is necessary to maintain a maximum relative humidity of about 80% to 100%, but this is difficult to achieve with an external source of hydration.

In order to increase the water retention in the membranes of fuel cells at high temperature, certain authors have turned towards the development of more complex membranes comprising mineral particles in addition to a conductive organic polymer matrix. These membranes are especially denoted by the term "inorganic-organic hybrid membranes".

The first hybrid membranes were developed at the end of the 1990s.

Thus, Malhotr et al., in J. Electrochem. Soc., 1997, 144 [1], describe membranes that are resistant to temperatures of up to 110° C., comprising a polymer of the Nafion® type impregnated with a doping solution of mineral heteropolyacids.

Other hybrid membranes based on non-sulfonated polymers, for instance polybenzimidazoles (Staiti et al., J. Power Sources, 2000, 90, 231 [2]), polyarylethersulfones (Baradie et al., Macromol. Symp., 1999, 138, 85 [3]) and styrene/ethylene/butene/styrene copolymers (Hirate et al., J. Sol-Gel Sci. And Techn., 2000, 17, 61 [4]) each incorporating conductive heteropolyacids of tungstophosphoric type, have also been studied.

However, these hybrid membranes have the drawback of requiring a heteropolyacid content that may be up to 70% in order to approach the performance qualities of Nafion® membranes.

In order to circumvent the drawbacks associated with the use of particles of the heteropolyacid type described above, certain authors have replaced particles of this type with clay particles.

When they are incorporated into membranes based on conductive organic polymer, clay particles prove to be particularly advantageous for the following reasons:

they give the membranes excellent water-retaining properties;

they prove to be particularly stable at high temperatures;

they show good percolation properties for low contents.

However, the authors, who developed these membranes containing clay particles, have found that the provision of clay particles does not significantly improve the proton conductivity of the membrane.

There is thus a real need for conductive particles that can be incorporated into fuel cell membranes, and that simultaneously afford high water retention, even at high temperature so as to avoid the drying-out of the membranes, and an improvement in the proton conductivity of the membranes into which they are incorporated.

DESCRIPTION OF THE INVENTION

The Inventors have developed a process for preparing proton-conducting clay particles, resulting in the production of particles having the advantages stated above.

According to a first subject, the invention thus relates to a process for preparing proton-conducting clay particles, successively comprising the following steps:

a) a step of activating a clay powder, in which the said powder is subjected to a gas plasma b) a grafting step in which the activated powder obtained from step a) is placed in contact with a solution comprising at least one compound comprising at least one group chosen from —$PO_3H_2$, —$CO_2H$ and —$SO_3H$ and salts thereof and comprising at least one group capable of grafting onto the surface of the said powder.

It is pointed out that, for the purposes of the invention, the term "grafting" means an immobilization of the compound(s) bearing at least one group chosen from —$PO_3H_2$, —$CO_2H$ and —$SO_3H$ onto the clay particles by means of a covalent chemical bond, by virtue of the presence on these compounds of at least one group capable of chemically grafting onto the surface of these particles.

As a variant, the process of the invention may successively comprise the following steps:

a') a step of activating a clay powder, in which the said powder is subjected to a gas plasma;

b') a grafting step in which the activated powder obtained from step a') is placed in contact with a solution comprising a first compound comprising at least one group capable of grafting onto the surface of the said powder and comprising at least one reactive group capable of reacting with a second compound comprising at least one group chosen from —$PO_3H_2$, —$CO_2H$ and —$SO_3H$ and salts thereof c') a step of placing the grafted powder obtained from step b') in contact with the second compound, so as to form a covalent bond between the said first compound and the said second compound.

Thus, the Inventors have modified the surface state of a clay powder by subjecting it to a gas plasma, thus permitting the grafting of compounds onto the surface of the clay, these grafted compounds giving this clay proton conductivity by virtue of the presence of —$PO_3H_2$, —$CO_2H$ or —$SO_3H$ groups.

Clays that are particularly suitable for the invention are clays belonging to the smectite family. Smectite clays may be either synthetic, for instance laponite (sold by Laporte Industries, UK) or natural, for instance montmorillonite, beidellite, saponite or hectorite.

More specifically, the smectite clays are di- and/or trioctahedral 2:1 phyllosilicates composed of leaflets comprising an octahedral layer, the centre of the octahedra of which is occupied by aluminium and possibly magnesium, the said octahedral layer being surrounded by two tetrahedral layers, the centre of each of the tetrahedra of which is occupied by silicon. These leaflets stack up in parallel to form particles whose various assemblies give rise to the formation of aggregates with a maximum size of about 2 micrometers. Inside the leaflets, isomorphic substitutions with ions of lower valency take place, thus giving rise to a charge deficit at the surface of the leaflets, this deficit being compensated for by cations that become housed in the lamellar space. In the presence of polar solvents, such as water, the abovementioned cations have the capacity of receiving solvent molecules in their coordination sphere, thus leading to distancing of the leaflets. This phenomenon explains why smectite clays are commonly referred to as swelling clays, by virtue of their high capacity for retaining polar solvents, such as water.

Clays that are particularly advantageous in the context of this invention may also be "pillared" smectite clays (also known as bridged clays). These clays result from the intercalation of simple or mixed metal polycations between their leaflets, forming metal pillars between the said leaflets.

Such clays are generally obtained by placing a smectite clay suspension in contact with a solution of a metal hydroxide (for example aluminium hydroxide or iron hydroxide) followed by a calcination treatment, for example at a temperature ranging from 300 to 500° C.

These pillared clays prove to be particularly advantageous for the following reasons:

they do not undergo any changes in porosity when exposed to high temperature;

they have a specific surface area that may be up to ten times that of unbridged clays;

they are characterized by a variable porosity that may range from micropores to macropores, passing through mesopores; and they offer a larger number of grafting sites than that of unbridged clays.

As mentioned above, the process according to the invention comprises, in a first stage, a step consisting in subjecting a clay powder as defined above to a gas plasma, such as a plasma of $CO_2$, He or of He/$CO_2$ mixture.

It is pointed out that the term "gas plasma" means a gas whose atoms or molecules have been ionized.

This step is conventionally performed in a plasma reactor, the gas being injected into a chamber under vacuum, at a pressure that may range from a few millibars to several bars, for example a pressure equal to 0.1 mbar. When the desired vacuum is reached, an electrical discharge is established between two electrodes placed in the chamber, the frequency possibly ranging from a few hertz to several thousand hertz, for example possibly equal to 13.56 MHz. The duration of this step may range from a few seconds to several tens of minutes depending on the desired degree of activation, it being understood that the longer the duration of the treatment and the higher the power of the electrical discharges, the greater will be the capacity of the clay powder to receive a large proportion of grafted molecules.

It is pointed out that, during the activation step, the clay powder is advantageously subjected to ultrasonic agitation, so as to avoid the formation of aggregates.

After the activation step, the clay powder is placed in contact, according to the first subject, with a solution comprising at least one compound comprising at least one group chosen from —$PO_3H_2$, —$CO_2H$ and —$SO_3H$ and salts thereof and comprising at least one group capable of grafting onto the surface of the said powder, such a group capable of being grafted advantageously being an ethylenic group (i.e. a group comprising a carbon-carbon double bond).

In the text hereinabove and hereinbelow, the term "salts" means compounds as defined above in which the acidic protons of the —$PO_3H_2$, —$SO_3H$ and —$CO_2H$ groups are replaced with cations, such as cations of alkali metals (for example Na or K).

Suitable compounds may be vinyl monomers, i.e. monomers comprising at least one ethylenic group (i.e. comprising a carbon-carbon double bond). These monomers prove to be particularly advantageous due to the presence of this ethylenic group, which is an excellent group capable of being grafted onto the surface of activated clay particles.

Among the vinyl monomers that may be used, mention may be made of vinylsulfonic acid, vinylphosphonic acid and vinylacetic acid, and salts thereof.

Among the vinyl monomers that may be used, mention may also be made of styrene monomers such as 4-vinylbenzoic acid or 3-vinylbenzoic acid, 4-vinylbenzenesulfonic acid or 3-vinylbenzenesulfonic acid, and 4-vinylbenzenephosphonic acid or 3-vinylbenzenephosphonic acid.

The vinyl monomers that may be used may also be fluorinated monomers, i.e. monomers in which one or more hydrogen atoms are replaced with fluorine atoms.

During the grafting step, it may occur that the unreacted monomer compounds polymerize together or remain in solution. In order to remove all traces of possible polymer(s) or of monomers that have not reacted with the clay particles, the process according to the invention may also comprise a washing step corresponding to washing of the grafted clay with a solvent for the monomer(s) used for the grafting of the corresponding possible polymer(s).

In addition to the advantages already stated, the process for manufacturing proton-conducting particles also has the advantages of being quick and easy to perform, of requiring only commonly used laboratory and industrial equipment, and of leading to the production of particles in the form of a clay powder, which, besides very high water-retaining properties, show excellent proton conductivity.

A subject of the invention is thus also particles that may be obtained via the process as described above.

Such particles are in the form of a clay powder grafted with residues of compounds comprising at least one group chosen from $-PO_3H_2$, $-CO_2H$ and $-SO_3H$, and salts thereof.

These residues of compounds may advantageously be vinyl monomer residues, preferably styrene residues, such as those defined above.

In addition to excellent water-retaining properties, the said particles show excellent proton-conducting and thus ion mobility properties.

These particles may thus be used for the separation or recovery of metals in solution.

The particles of the invention may also find their application in the design of conductive composite materials, such as conductive membranes, especially proton-conducting membranes for use in fuel cells.

A subject of the invention is thus also a proton-conducting composite material comprising a polymer matrix in which are dispersed particles as defined above.

According to a first alternative, the polymer matrix may be a non-proton-conducting polymer matrix.

Such polymers may be fluorinated polymers such as polytetrafluoroethylene (PTFE), polyvinylidene fluoride (PVDF) and tetrafluoroethylene/ethylene (ETFE) copolymer, and derivatives thereof. Fluorinated polymers especially have the advantage of having good mechanical strength and also good chemical resistance.

Such polymers may also be aromatic or heterocyclic polymers. It is pointed out that the term "aromatic or heterocyclic polymers" means a polymer whose main chain comprises a sequence of aromatic units (for example phenylene) or heterocyclic units (for example benzimidazole). Among these polymers, mention may be made of polysulfones, polyaryl ether ketones, polyimides, polybenzimidazoles, polyphenylene oxides and polycarbonates. Such polymers have the particular feature of giving the composite material into which they are incorporated high rigidity and high chemical resistance and heat stability, without requiring the incorporation of a supply of reinforcing agent or filler into the composite material.

According to a second alternative, the polymer matrix may be a proton-conducting polymer matrix.

Such polymers may be sulfonated perfluorinated polymers. It is pointed out that the term "sulfonated perfluorinated polymers" means polymers comprising a perfluorinated linear main chain and side chains bearing sulfonic acid groups. Such polymers are especially commercially available under the registered trademark Nafion® by the company Dupont de Nemours, or Aciplex-S® by the company Asahi Chemical.

Such proton-conducting polymers may also be aromatic or heterocyclic polymers bearing acid functions chosen from $-SO_3H$, $-PO_3H_2$ and $-CO_2H$. Such polymers may be polysulfones, polyaryl ether ketones, polyimides, polybenzimidazoles, polyphenylene oxides or polycarbonates.

The composite material according to the invention is advantageously in the form of a film having, for example, a thickness of from 50 to 150 µm.

The invention also relates to processes for preparing a proton-conducting composite material as defined above.

To prepare a proton-conducting material of the invention, two alternatives may be envisaged, according to the invention.

According to a first alternative, the process successively comprises the following steps:

mixing, in the absence of solvent, one or more constituent polymers of the matrix with particles as defined above;

melt-forming the composite material from the mixture obtained.

As a variant, the process may successively comprise the following steps:

melting, in the absence of solvent, one or more constituent polymers of the matrix;

incorporating particles as defined above into the polymer or the melt polymer blend.

According to the first alternative, the heat treatment generally comprises a step of heating the mixture obtained after the first step to a temperature that may range from 100° C. to 300° C., so as to obtain a melt blend, and a simultaneous or consecutive step of forming the blend, in order to obtain the desired composite material, this forming operation possibly consisting of calendering.

Among the suitable melt-route heat treatments, mention may be made of extrusion.

According to a second alternative, the process successively comprises the following steps:

a step of mixing a solution comprising particles as defined above and one or more solvents with one or more constituent polymers of the matrix;

a step of forming, from the mixture obtained, a composite material by evaporation of the solvent(s).

According to this second alternative, the solution may be poured onto a support, for example a glass, alumina or polyethylene support, and the material in film form is then formed by evaporation of the solvent(s). After this process, a material in film form deposited on the support is obtained. The film obtained may be readily detached from the support, to give a self-supporting proton-conducting film.

It is pointed out that the solvents that may be used in the context of this process may be chosen from polar aprotic solvents such as dimethylformamide, dimethylacetamide, tetrahydrofuran or dimethylsiloxane, or chlorinated solvents, for instance chloroform, but also solvents such as alcohols, ethers or acetone.

On account of their mechanical properties, these materials may be used efficiently and lead to thin films that are strong enough to be used as fuel cell membranes.

Thus, a subject of the invention is a fuel cell membrane comprising a proton-conducting composite material as defined above.

These membranes are advantageously in the form of thin films having, for example, a thickness of from 20 to 200 micrometers.

These membranes advantageously have sufficient impermeability to the reactant gases (such as $H_2$ and $O_2$) and are stable, preferably up to a temperature of at least 150° C.

Preferably, the constituent composite material of the membrane comprises from 1% to 20% by weight of clay particles as defined above, when the polymer matrix comprises one or more proton-conducting polymers.

Preferably, the constituent composite material of the membrane comprises from 5% to 50% by weight of clay particles as defined above, when the polymer matrix comprises one or more non-proton-conducting polymers.

It is pointed out that the above percentages are expressed relative to the total weight of the composite material.

The membranes of the invention are prepared via processes that are identical to those defined above for the proton-conducting composite material.

The membranes as defined above may be advantageously incorporated into fuel cell devices.

Thus, the invention also relates to a device comprising at least one electrode-membrane-electrode assembly, in which the membrane is as defined above.

The fuel cell device generally comprises several electrode-membrane-electrode assemblies.

To prepare such an assembly, the membrane may be placed between two electrodes, for example made of fabric or carbon paper impregnated with a catalyst. The assembly formed from the membrane placed between the two electrodes is then pressed at an adequate temperature so as to obtain good electrode-membrane adhesion.

The electrode-membrane-electrode assembly is then placed between two plates that provide electrical conduction and the feed of reagents to the electrodes. These plates are commonly known as bipolar plates.

The invention will now be described in the light of the examples given below, which are given as non-limiting illustrations.

BRIEF DESCRIPTION OF THE DRAWINGS

The single FIGURE is a graph representing the degree of hydration $\theta$ (in %) as a function of the time t (in minutes) at 75° C. of a Nafion® membrane without particles (curve on which the points are represented by squares) and of a reconstituted Nafion® membrane comprising particles in accordance with the invention (test 14) (curve whose points are represented by diamonds).

DETAILED DESCRIPTION OF PARTICULAR EMBODIMENTS

Example 1

This example illustrates the preparation of 7% grafted laponite clay particles.

The term "7% grafted" means a clay that has undergone the treatment described in the invention so as to comprise 7% by mass of sulfur derived from the grafting of compounds comprising —$SO_3H$ functions.

The preparation protocol is as follows.

An RD type laponite (2 g) is placed in a crucible, which is itself introduced into the chamber of a plasma reactor, the assembly being subjected to ultrasonic agitation. A primary vacuum is established, followed by the introduction of helium into the chamber to a pressure of 0.1 mbar. An electrical discharge is established between two electrodes placed in the chamber, at a frequency of 13.56 MHz. After this treatment, a clay modified by plasma treatment is obtained.

4 g of styrene-para-sulfonic acid (or 4-vinylbenzenesulfonic acid) are dissolved in dimethylformamide (DMF). The premodified clay is then placed in contact with the styrene-para-sulfonic acid solution in DMF and refluxed overnight.

The grafted clay is then washed with DMF in order to remove any possible traces of sulfonated homopolymer that might have been formed during the grafting.

The clay thus obtained has a sulfur mass proportion of 7% (measured by elemental analysis), which corresponds to an ion-exchange capacity (IEC) of 1.8 meq/g.

Example 2

This example illustrates the preparation of a 9% grafted pillared laponite clay.

The starting laponite clays are RD laponites bridged with Al/Fe (50%/50%) and with Al, i.e. clays in which aluminium polycations, or a mixture of aluminium and iron polycations, are incorporated between the clay leaflets, with a specific surface area of 350 $m^2/g$ and a mesopore volume of about 0.3 $cm^3/g$.

The procedure performed in this example is the same as that of Example 1.

This leads to bridged laponite clays with a sulfur content of 9% (obtained by elemental analysis) corresponding to an ion-exchange capacity (IEC) of 3 (±0.2) meq/g.

Example 3

This example illustrates the preparation of membranes of different composition by evaporation casting.

The general preparation protocol is as follows.

In a first stage, the modified clay is dispersed in a suitable organic solvent (in this case DMF). The mass of solvent represents about 80% by weight of the mass of polymer to be used to constitute the matrix. After vigorous stirring of the solution comprising the clay and the DMF, using a magnetic stirrer, the polymer intended to constitute the matrix is gradually added. The solution obtained is stirred for at least 48 hours until the polymer has fully dissolved. The resulting solution is then subjected to an ultrasonic bath for several minutes. If air bubbles appear in solution, the solution is degassed.

In a second stage, the viscous mixture is deposited on a glass plate using a "hand coater" placed under a laminar-flow fume cupboard. The applicator chosen for the casting depends on the viscosity of the solution, which is a function of its composition, and in particular of its mass content of clay. Conventionally, the gap of the applicator used ranges from 750 µm to 1250 µm. Slow evaporation of the solvent is obtained by placing the glass plate on a thermostatically regulated plate whose temperature is set at 30° C. The drying time lasts for about 6 to 7 hours.

It should be noted that the grafted clay is stored, before use, in a thermostatically regulated oven. As regards the polymer, it may be in the form of a fine powder, as is the case for the poly(vinylidene fluoride) (PVDF) fluorinated polymer used in tests 1 to 8, or alternatively in the form of a viscous solution, as for Nafion®, which is dissolved in a mixture of alcohols used in tests 9 to 15.

Various membranes were prepared according to the technique described above. The nature of the clay and of the polymer, and also the proportions of these components for each of the membranes, are given in Table 1 collating the membranes whose matrix is made of PVDF and in Table 2 collating the membranes whose matrix is made of Nafion®.

TABLE 1

| | | CLAY | |
|---|---|---|---|
| Test | % PVDF | % | Description |
| 1 | 100 | 0 | / |
| 2 | 75 | 25 | unbridged and ungrafted |
| 3 | 75 | 25 | Al-bridged and 9% grafted (Example 2) |
| 4 | 75 | 25 | Al/Fe-bridged and 9% grafted (Example 2) |
| 5 | 75 | 25 | unbridged and 7% grafted (Example 1) |
| 6 | 70 | 30 | |
| 7 | 60 | 40 | |
| 8 | 50 | 50 | |

TABLE 2

| | | UNBRIDGED CLAY | |
|---|---|---|---|
| Test | % Nafion ® | % | description |
| 9 | 100 | 0 | / |
| 10 | 90 | 10 | ungrafted |
| 11 | 98 | 2 | 7% grafted (Example 1) |
| 12 | 97 | 3 | |
| 13 | 95 | 5 | |
| 14 | 90 | 10 | |
| 15 | 85 | 15 | |

Example 4

This example illustrates the preparation of membranes of various compositions by film extrusion.

More specifically, in this example, blends comprising the PVDF polymer and the grafted pillared clay (Example 2) or ungrafted pillared clay were prepared by extrusion. The blends are composed of PVDF sold by Solvay and of various mass contents of 9% grafted Al-pillared clays (the 9% content indicating that the clays comprise 9% sulfur after modification) (Example 2) and ungrafted Al-pillared clays. Before introducing them into the extruder, the various constituents of the blend are stoved at 80° C. for 24 hours.

The PVDF is introduced into the extruder by means of a weight-metering device at a constant delivery rate of 350 g/h. The pillared clay is introduced by means of a weight-metering device whose delivery rate is modulated so as to obtain various compositions containing from 20% to 40% by weight of clay.

The extruder used in the context of this example is a co-rotating twin-screw extruder. It is equipped with interpenetrating-screws and with a sheath and allows narrow residence time distributions to be obtained. The pressure equilibrium allows high torques, shear rates and delivery rates. The feed zone comprises two conveying screws which prevent congestion thereof and the formation of a blockage at the level of the feed hopper. The PVDF is introduced at the start of the feed zone, whereas the clay is introduced downstream of the polymer feedpoint.

Homogeneous blends are obtained at the extruder outlet.

After extrusion, the blends obtained are formed using a flat die with a 200 μm gap and a drawing system, in the form of thin films 100 μm thick.

The compositions of the various membranes prepared according to the protocol described above are collated in Table 3 below.

TABLE 3

| | | CLAY | |
|---|---|---|---|
| Test | % PVDF | % | Description |
| 16 | 100 | / | / |
| 17 | 80 | 20 | Al-bridged and ungrafted |
| 18 | 60 | 40 | |
| 19 | 80 | 20 | Al-bridged and 9% grafted (Example 2) |
| 20 | 60 | 40 | |

Example 5

This example is directed towards illustrating the electrochemical properties of the membranes obtained by evaporation casting (Example 3) and extrusion (Example 4) of the invention.

Before measuring these properties, the PVDF-based and Nafion®-based membranes were subjected to a step of regeneration of the sulfonic functions ($SO_3H$). This step consists in successively immersing the membranes in $H_2O_2$ solution (35%) for 1 hour and then in $H_2SO_4$ solution (0.5 M) for 1 hour, followed by rinsing in boiling water for 1 hour. The membranes are then stored in a bath of deionized water for at least 20 minutes. The thickness of the films obtained ranges from 80 to 180 μm.

The membranes are characterized in this example in terms of proton conductivity, degree of hydration and theoretical ion-exchange capacity (calculated IEC).

The proton conductivity σ, expressed in $S \cdot cm^{-1}$, is measured using an impedance meter connected to a platinum electrode cell dipping into a bath of deionized water at room temperature. The electrode-membrane contact is provided by a spring located at the end of one of the electrodes. The frequency analyzer used is a Solartron 1255 connected to a Novocontrol electrochemical interface (NBS).

The degree of hydration is determined by using an infrared desiccator. The water-soaked membrane is weighed and the corresponding wet mass $m_w$ is noted. By means of the infrared desiccator, the membrane undergoes a drying cycle (15 minutes at 140° C.) and its dry mass $m_d$ is then determined. The degree of hydration G, expressed as a mass percentage, of the membrane may then be calculated according to the equation:

$$G = ((m_w - m_d)/m_d) \times 100$$

The theoretical ion-exchange capacities (IEC) are calculated on the principle that the IEC of the composite membrane obeys a law of additivity in which each of its components bearing sulfonic functions contributes towards the overall IEC of the membrane as a pro-rata of its mass percentage, as is expressed in the equation below:

$$IEC_{theoretical} = (\%_{polymer} \times IEC_{polymer}) + (\%_{clay} \times IEC_{clay})$$

Elemental analysis of the polymers and clays used in the invention makes it possible to determine the mass percentage of the sulfur element and thus the IEC associated with the corresponding sulfonic functions.

The results are given in Table 4 below.

TABLE 4

| Test | Theoretical IEC (meq · g$^{-1}$) | Degree of hydration (%) | σ (in S · cm$^{-1}$) |
|---|---|---|---|
| Nafion ® | 0.91 | 31 | $2.18 \times 10^{-2}$ |
| 9 | 0.91 | 40 | $1.82 \times 10^{-2}$ |
| 10 | 0.77 | 87 | $1.41 \times 10^{-2}$ |
| 11 | 0.93 | 44 | $2.19 \times 10^{-2}$ |

TABLE 4-continued

| Test | Theoretical IEC (meq·g$^{-1}$) | Degree of hydration (%) | σ (in S·cm$^{-1}$) |
|---|---|---|---|
| 12 | 0.94 | 52 | $2.04 \times 10^{-2}$ |
| 13 | 0.96 | 51 | $1.78 \times 10^{-2}$ |
| 14 | 1.02 | 80 | $4.44 \times 10^{-2}$ |
| 15 | 1.07 | 71 | $3.57 \times 10^{-2}$ |
| 1 | 0 | 7 | $10^{-7}$ |
| 2 | 0 | 20 | $8.13 \times 10^{-6}$ |
| 3 | 0.70 | 23 | $1.02 \times 10^{-5}$ |
| 4 | 0.70 | 24 | $9.59 \times 10^{-6}$ |
| 5 | 0.50 | 35 | $1.49 \times 10^{-5}$ |
| 6 | 0.60 | 38 | $2.57 \times 10^{-5}$ |
| 7 | 0.80 | 65 | $2.00 \times 10^{-4}$ |
| 8 | 1.00 | 120 | $7.05 \times 10^{-5}$ |
| 16 | 0 | 7 | $<10^{-7}$ |
| 17 | 0 | 47 | $<10^{-7}$ |
| 18 | 0 | 90 | $<10^{-7}$ |
| 19 | 0.60 | 42 | $5 \times 10^{-5}$ |
| 20 | 1.20 | 82 | $8 \times 10^{-4}$ |

The addition of particles in accordance with the invention to Nafion® (tests 11 to 15) makes it possible to maintain a theoretical IEC for the material that is at least equivalent to that of the initial Nafion® (test 9). For the same content added to a Nafion® matrix, the incorporation of grafted clay into a Nafion® matrix makes it possible to achieve conduction values higher than that of the matrix alone, but also than that of a matrix incorporating an amount of ungrafted clay (test 10). In the case of matrices having no intrinsic proton conduction, for instance the PVDF-based matrices (tests 1 to 8), the addition of grafted clay makes it possible to achieve proton-conducting properties, the copolymer not having these properties in the inert form. It is moreover noted that a conductivity maximum is achieved for a particle proportion of 40% by mass (test 7).

Furthermore, irrespective of the polymer matrix used, the addition of particles also allows optimum hydration of the membrane. Specifically, the addition of grafted clay systematically improves the degree of hydration of the matrix used, whether it is proton-conducting (Nafion® with tests 11 to 15) or non-proton-conducting (PVDF with tests 3 to 8 and 17 to 20).

The results obtained with the extruded membranes (tests 16 to 20) are in total agreement with the conclusions put forward in the case of the membranes made by evaporation casting. By comparing tests 4 and 19, it may be noted that, for a similar particle content (25% and 20%, respectively), the implementation by extrusion makes it possible to achieve conductivities that are slightly higher than those measured in the case of the membranes made by evaporation casting. This result may be attributed to better accessibility of the particles in the extruded membrane, due to better dispersion of the clay particles via implementation of the extrusion process.

It may thus be concluded that:

the addition of particles allows better hydration of the membranes when compared with the uncharged membranes. This result is particularly important in the case of the sulfonated perfluorinated membranes, given the hydration defects displayed by Nafion® at temperatures above 80° C.;

the presence of particles in the membranes, such as Nafion® membranes, makes it possible to maintain the conduction properties of Nafion®, given an IEC in the hybrid membrane equivalent to that of the uncharged Nafion®;

the particles impart proton conductivity to membranes made of non-conductive polymers, such as PVDF-based membranes.

The example given below makes it possible to demonstrate that the nanoparticles of the invention can improve the proton conductivity and the hydration of membranes into which they are incorporated.

Example 6

This example is directed towards demonstrating the water-retaining properties of the membranes of the invention. The membrane tested in this example is that of test 14 (cf. Example 3, Table 2).

The membrane dehydration kinetics measurements are performed using an oven whose temperature is set at 75° C. The membranes are preactivated according to the protocol described in Example 5. The membranes are then stored for 24 hours in a bath of deionized water at room temperature in order to achieve a maximum and stable state of hydration. At time $t_0$, the soaked membranes are placed in the oven at 75° C., and the mass of the samples is then recorded at regular intervals. The change in the degree of hydration of the membrane as a function of time makes it possible to evaluate the water desorption kinetics at high temperature in the membranes. By way of example, the desorption kinetics at 75° C., obtained in the case of Nafion®-based membranes, are given in the attached single FIGURE.

It is observed in this FIGURE that the water-retaining capacity at 75° C. is much higher for the membranes comprising particles in accordance with the invention than in the case of the uncharged Nafion®.

Thus, the membranes comprising particles in accordance with the invention show a good water-retaining capacity at high temperature by virtue of the addition of particles in accordance with the invention. Specifically, at 75° C., it takes approximately four times as long for the membrane comprising particles to lose its water of hydration as for Nafion® alone.

It may thus be noted that the Nafion® membranes incorporating particles in accordance with the invention have an important advantage over the Nafion® membranes without particles, in that they offer a higher degree of hydration and a higher water-retaining capacity. It may be concluded therefrom that the membranes based on a perfluorinated matrix with particles of the invention have a water management capacity that is markedly less problematic than in the case of the Nafion® membranes without particles.

REFERENCES CITED

[1] J. Electrochem. Soc., 1997, 144;
[2] J. Power Sources, 2000, 90, 231;
[3] Macromol. Symp., 1999, 138, 85;
[4] J. Sol-Gel Sci. And Techn., 2000, 17, 61.

The invention claimed is:

1. Process for preparing proton-conducting clay particles, successively comprising the following steps:
   a) providing clay particles in the form of a powder;
   b) activating the clay particles, by subjecting said particles to a gas plasma, said particles thus constituting activated particles; and
   c) contacting said activated particles with a solution comprising at least one compound comprising at least one group chosen from —PO$_3$H$_2$, —CO$_2$H and —SO$_3$H and salts thereof and comprising at least one group capable of grafting onto a surface of said activated particles,
   whereby proton-conducting clay particles in the form of a powder are obtained having on their surfaces at least one compound comprising at least one group chosen from —$PO_3H_2$, —$CO_2H$ and —$SO_3H$ and salts thereof, and wherein the at least one compound is grafted to the clay particles through covalent chemical bonds.

2. Process for preparing particles according to claim 1, in which the clay powder is a smectite clay powder.

3. Process for preparing particles according to claim 2, in which the smectite clay powder is synthetic or natural.

4. Process for preparing particles according to claim 3, in which the synthetic smectite clay powder is a laponite.

5. Process for preparing particles according to claim 3, in which the natural smectite clay powder is chosen from the group consisting of montmorillonite, beidellite, saponite, and hectorite.

6. Process for preparing particles according to claim 1, in which the clay powder is a pillared smectite clay powder.

7. Process for preparing particles according to claim 1, in which the gas plasma is a plasma of $CO_2$, of helium or of a $CO_2$/He mixture.

8. Process for preparing particles according to claim 1, in which the at least one compound is a vinyl monomer.

9. Process for preparing particles according to claim 8, in which the vinyl monomer is chosen from vinylsulfonic acid, vinylphosphonic acid and vinylacetic acid.

10. Process for preparing particles according to claim 8, in which the vinyl monomer is a styrene monomer.

11. Process for preparing particles according to claim 10, in which the styrene monomer is chosen from 4-vinylbenzoic acid, 3-vinylbenzoic acid, 4-vinylbenzenesulfonic acid, 3-vinylbenzenesulfonic acid, 4-vinylbenzenephosphonic acid and 3-vinylbenzenephosphonic acid.

12. Process for preparing particles according to claim 8, in which the vinyl monomer is a fluorinated monomer.

13. Proton-conducting clay particles having at least one compound comprising at least one group chosen from —$PO_3H_2$, —$CO_2H$ and —$SO_3H$ and salts thereof, grafted to a surface thereof through covalent chemical bonds, said particles obtained via the process according to claim 1.

14. Proton-conducting composite material comprising a polymer matrix in which are dispersed particles as defined according to claim 13.

15. Composite material according to claim 14, in which the matrix is a non-proton-conducting polymer.

16. Composite material according to claim 15, in which the non-proton-conducting polymer is a fluorinated polymer.

17. Composite material according to claim 16, in which the fluorinated polymer is chosen from polytetrafluoroethylene (PTFE), polyvinylidene fluoride (PVDF) and tetrafluoroethylene/ethylene copolymer (ETFE).

18. Composite material according to claim 15, in which the non-proton-conducting polymer is an aromatic or heterocyclic polymer.

19. Composite material according to claim 18, in which the aromatic or heterocyclic polymer is chosen from polysulfones, polyaryl ether ketones, polyimides, polybenzimidazoles, polyphenylene oxides and polycarbonates.

20. Composite material according to claim 14, in which the matrix is a proton-conducting polymer.

21. Composite material according to claim 20, in which the proton-conducting polymer is a sulfonated perfluorinated polymer.

22. Composite material according to claim 20, in which the proton-conducting polymer is an aromatic or heterocyclic polymer bearing acid functions chosen from —$SO_3H$, —$PO_3H_2$ and —$CO_2H$.

23. Fuel cell membrane comprising a composite material as defined according to claim 14.

24. Fuel cell membrane according to claim 23, in which the composite material of the membrane comprises from 1% to 20% by weight of proton-conducting clay particles, when the polymer matrix comprises one or more proton-conducting polymer(s).

25. Fuel cell membrane according to claim 23, in which the composite material of the membrane comprises from 5% to 50% by weight of proton-conducting clay particles, when the polymer matrix comprises one or more non-proton-conducting polymer(s).

26. Fuel cell membrane according to claim 23, which is in the form of a film with a thickness ranging from 20 to 200 micrometers.

27. Fuel cell device comprising at least one electrode-membrane-electrode assembly, in which the membrane comprises a composite material as defined according to claim 14.

* * * * *

UNITED STATES PATENT AND TRADEMARK OFFICE
CERTIFICATE OF CORRECTION

| | | |
|---|---|---|
| PATENT NO. | : 8,562,728 B2 | Page 1 of 1 |
| APPLICATION NO. | : 11/547443 | |
| DATED | : October 22, 2013 | |
| INVENTOR(S) | : Galiano et al. | |

It is certified that error appears in the above-identified patent and that said Letters Patent is hereby corrected as shown below:

On the Title Page,
(75) Inventors, after "Herve Galiano", replace "Jour" with --Joue--.

Signed and Sealed this
Fourth Day of February, 2014

Michelle K. Lee
*Deputy Director of the United States Patent and Trademark Office*